(No Model.)
C. C. JEROME.
PISTON ROD PACKING.
No. 467,105.          Patented Jan. 12, 1892.
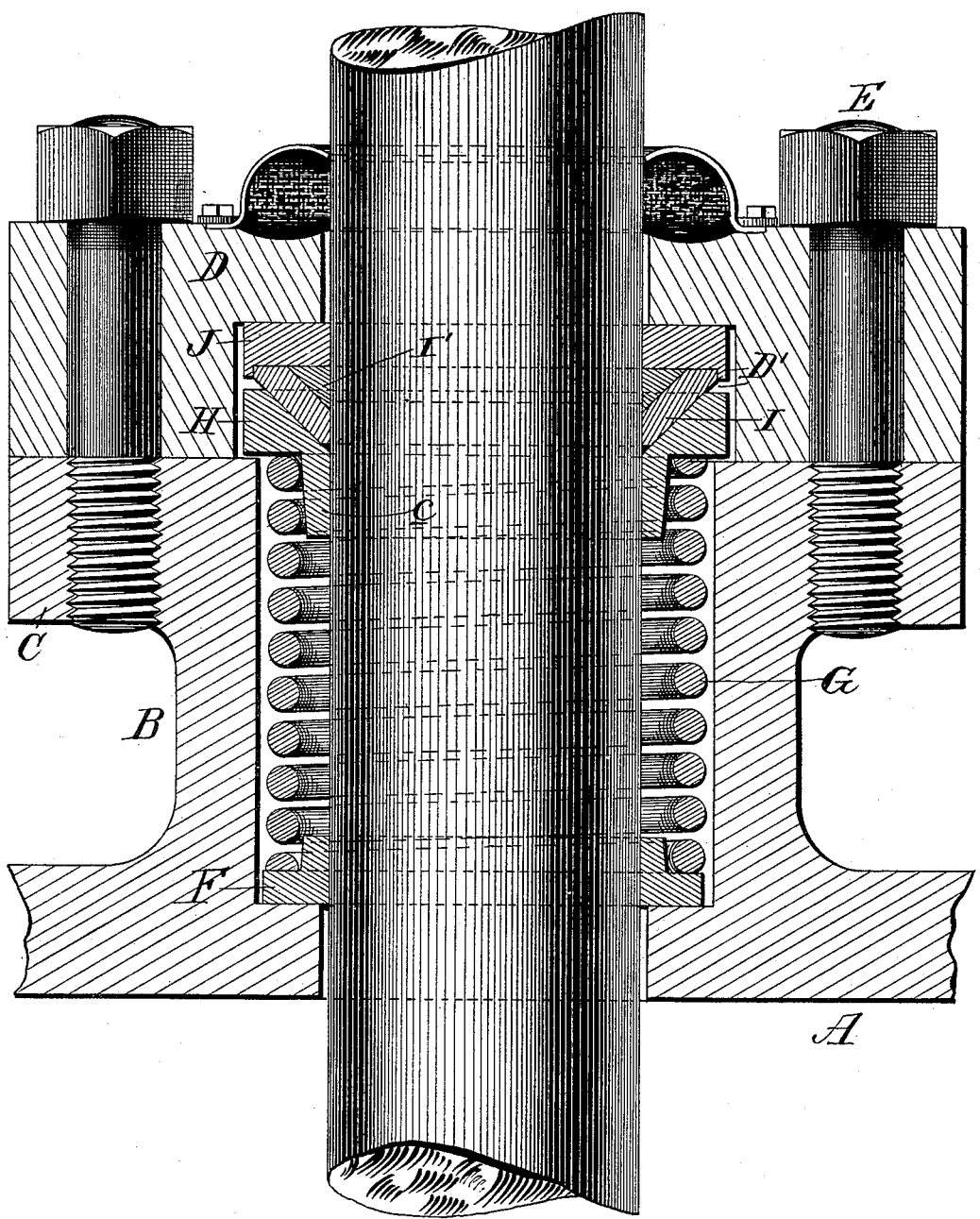
Witnesses
E. H. Ettingham
G. F. Downing
Inventor
C. C. Jerome
By H. A. Seymour
Attorney

UNITED STATES PATENT OFFICE.

CHARLES C. JEROME, OF CHICAGO, ILLINOIS.

PISTON-ROD PACKING.

SPECIFICATION forming part of Letters Patent No. 467,105, dated January 12, 1892.

Application filed May 5, 1891. Serial No. 391,641. (No model.)

*To all whom it may concern:*

Be it known that I, CHARLES C. JEROME, of Chicago, in the county of Cook and State of Illinois, have invented certain new and useful Improvements in Piston-Rod Packing; and I do hereby declare the following to be a full, clear, and exact description of the invention, such as will enable others skilled in the art to which it appertains to make and use the same.

My invention relates to an improvement in piston-rod packing, and is designed more particularly as an improvement over the construction disclosed in my application, Serial No. 391,406, filed by me May 2, 1891, and executed even date herewith.

In the device disclosed in the application above referred to the cone, packing-rings, and ring seat or follower are all located within the stuffing-box, and if any of the parts should stick to the piston there is nothing nearer than the adjacent head of the cylinder to dislodge them. Hence if the parts should stick to the rod and be moved away from the gland the stuffing-box would be practically open for the escape of steam and would remain open until the parts were returned to their normal position.

The object of this invention is to confine the packing parts of the device within a limited space, whereby practically all endwise movement is prevented; and with this end in view my invention consists in the parts and combinations of parts, as will be more fully described, and pointed out in the claim.

The accompanying drawing is a view in longitudinal section of a stuffing-box, showing my invention applied thereto.

A represents one head of a steam-cylinder, and B the stuffing-box thereon, having an outwardly-projecting flange C, upon the outer face of which is seated gland D, the latter being retained in place by the stud-bolts E.

The gland D and the head A of the cylinder are each provided with an opening for the passage of the piston-rod, the said openings being of slightly greater diameter than the piston-rod to permit the latter to have a slight vibration. The gland D is also provided on its inner face with a recess D' greater in diameter than the internal diameter of the stuffing-box, the said recess being adapted to receive parts to be hereinafter described.

F is a bushing seated against the head A of the cylinder and closely embracing the piston-rod, the external diameter of said bushing being somewhat less than the internal diameter of the stuffing-box, so as not to interfere with lateral or vibrating movement of the piston.

Seated on the bushing F is the spring G, which latter encircles the piston-rod and forms a yielding bearing for the cone H. The cone H is provided on its outer face with a conical or tapering recess, within which rest the beveled split ring I and the split wedge-ring I'. The beveled ring rests solidly against the tapering surface of the cone, with its beveled inner end in contact with the piston-rod, and the wedge-ring I' rests against the inclined face of the beveled ring. More than two rings and rings other than those described and shown can be used with good effect.

J is the seat-ring, ground to form a steam-tight joint with the adjacent face of the gland against which it bears, and is provided with a flange overlapping the beveled ring for preventing the latter from spreading under the pressure from the spring. The ring or rings used for packing the rod project beyond the outer edge of the cone and are forced into the cone as they wear away by contact with the piston-rod. The cone ring or rings and seat-ring are all located within the recess in the gland, and as the cone is greater in diameter than the internal diameter of the stuffing-box it follows that the cone can never enter the stuffing-box; but it and the split rings and the seat-ring are confined within the recess in the gland and have but slight movement in the direction of movement of the piston-rod. Hence it follows that if the rings should stick to the rod the cone would be stopped by the shoulder c and all inward movement of the parts which pack the rod prevented.

It is evident that numerous changes in the details of construction might be resorted to without departing from the spirit and scope of my invention. Hence I would have it understood that I do not confine myself to the exact construction and combination of parts as herein described.

Having fully described my invention, what I claim as new, and desire to secure by Letters Patent, is—

The combination, with a stuffing-box and gland, of a cone having a conical recess therein, a seat-ring provided with a flat inner face, and an inwardly-projecting flange at or near the outer edge thereof, and packing-rings located between the flat surface of the seat-ring and its flange and the conical recess of the cone, the diameter of the cone being greater than the diameter of the bore of the stuffing-box, substantially as set forth.

In testimony whereof I have signed this specification in the presence of two subscribing witnesses.

CHARLES C. JEROME.

Witnesses:
S. G. NOTTINGHAM,
G. F. DOWNING.